(12) United States Patent
Brandmeier et al.

(10) Patent No.: US 7,774,116 B2
(45) Date of Patent: Aug. 10, 2010

(54) DEVICE AND METHOD FOR CONTROLLING A PASSENGER PROTECTION SYSTEM OF A VEHICLE

(75) Inventors: Thomas Brandmeier, Wenzenbach (DE); Michael Feser, Barbing (DE); Michael Köppl, Sinzing (DE)

(73) Assignee: Siemens VDO Automotive AG, Munich (DE)

(*) Notice: Subject to any disclaimer, the term of this patent is extended or adjusted under 35 U.S.C. 154(b) by 300 days.

(21) Appl. No.: 11/915,662

(22) PCT Filed: May 5, 2006

(86) PCT No.: PCT/EP2006/062082
§ 371 (c)(1),
(2), (4) Date: Nov. 27, 2007

(87) PCT Pub. No.: WO2006/125719
PCT Pub. Date: Nov. 30, 2006

(65) Prior Publication Data
US 2009/0276125 A1  Nov. 5, 2009

(30) Foreign Application Priority Data
May 27, 2005 (DE) .................. 10 2005 024 319

(51) Int. Cl.
*G05D 1/00* (2006.01)
(52) U.S. Cl. .................. 701/47; 701/45; 701/49; 180/232; 180/271; 280/735
(58) Field of Classification Search .................. 701/45, 701/46, 47, 49; 180/232, 268, 271; 280/735
See application file for complete search history.

(56) References Cited

U.S. PATENT DOCUMENTS 7,407,029 B2 * 8/2008 Breed et al. .................. 180/274

* cited by examiner

*Primary Examiner*—Gertrude Arthur Jeanglaud
(74) *Attorney, Agent, or Firm*—Laurence A. Greenberg; Werner H. Stemer; Ralph E. Locher

(57) ABSTRACT

A device for controlling a passenger protection system of a motor vehicle includes at least one structure-borne noise sensor, used to receive body vibrations, and an evaluation device, used to evaluate the structure-borne noise signal. The evaluation provides information about an impact object and/or the characteristics of the impact. The evaluation device is configured to analyze the structure-borne noise signal in relation to the frequencies contained therein, wherein the frequency spectrum contained in a signal section is distributed into a plurality of frequency ranges. The current signal energy is determined for each frequency range, and the signal energy of the frequency range is a standardized. The device also comprises a passenger protection system, which can be actuated according to the information relating to the impact object and/or the characteristics of the impact. Further, the evaluation device is embodied such that during standardization, the signal energy of each frequency range is established in relation to the signal energy of a specific reference frequency range, and the resulting ratio course is compared to predetermined threshold values.

28 Claims, 4 Drawing Sheets

DEVICE AND METHOD FOR CONTROLLING A PASSENGER PROTECTION SYSTEM OF A VEHICLE

BACKGROUND OF THE INVENTION

Field of the Invention

The invention further relates to a method for controlling a passenger protection system of a motor vehicle as claimed in the preamble of claim 13.

When the term passenger protection system is used in the present invention it is to be understood both as a pedestrian protection system and also as a vehicle occupant protection system, with these systems being able to be arranged jointly or individually in a motor vehicle.

When the present disclosure refers to a pedestrian then this term is to be understood in a very general context. Naturally cyclists, rollerbladers or others encountered on the roads can also be covered by the representative term pedestrians employed here.

A device for controlling a passenger protection system of a vehicle is known from DE 103 09 227 A1. This includes an evaluation device for evaluating sensor signals so that information about the impact object and/or the characteristics of the impact can be provided. The evaluation device is embodied to analyze the sensor signal in respect of the frequencies contained therein, by dividing up a frequency spectrum contained in a section of a signal into a number of frequency bands, determining the available signal energy for each frequency band and undertaking a standardization of the signal energy of the frequency bands. A passenger protection system can be activated depending on the information about the impact object and/or the characteristics of the impact.

The device described in this document is used to detect an impact, especially a side impact, for occupant protection means of a motor vehicle. With this method a section of the output signal of an acceleration sensor is continuously analyzed in respect of the frequencies contained within it.

In such cases the method makes use of the idea that different non-trigger situations, so called "misuse" situations such as a side impact of the vehicle against a curb or a blow with a hammer against the motor vehicle, doors closing or such like, sometimes create output signals with amplitudes at similar levels to those of must-trigger situations. By contrast with this however they mostly contain only one or two typical frequencies which are determined by the vehicle construction, such as vibrations of the bodywork for example, vibrations in the motor vehicle, resonances of the attachment points of the sensor of such like. Must-trigger situations on the other hand are identified by the intrusion, i.e. by an object penetrating into the motor vehicle and thereby through the deformation of the side structure. This deformation leads in the output signal of the acceleration sensor to a wide spectrum of many frequencies, caused by the deformation or the breaking of structures of the vehicle.

The distribution of the frequencies in the output signal of the acceleration sensor is included as a detection characteristic for must-trigger situations. To this end the frequency spectrum contained in the section of the signal is divided up into a suitable number of frequency bands or ranges. Subsequently the available signal energy is determined for each frequency band. Afterwards a relationship of the partial signal energy to the overall energy of the signal section observed is formed. The relative activations of the different frequency bands obtained in this way are compared with threshold values which may be predetermined if necessary.

The disadvantage of this process lies in the fact that the device is restricted to the control of an occupant protection system. In particular the type of sensing does not allow objects with greatly differing mass to be distinguished in order to activate protection systems tailored to such objects The detection of vehicle body vibrations by means of structure-borne noise sensors and their evaluation by an evaluation device is further known from the prior art. A disclosure relating to this is to be found for example in DE 100 34 524 A1, DE 198 55 452 A1 or WO 2005/035318 A1.

DE 198 55 452 A1 discloses a device for controlling a passenger protection system of a vehicle which includes a sensor system for detecting a collision between an object and the motor vehicle. An evaluation device is provided for evaluating the signal delivered by the sensor system, so that information about the impact object and/or about the characteristics of the impact can be supplied. A passenger protection system is also provided, which can be actuated depending on the information about the impact object and/or about the characteristics of the impact. The sensor system includes at least one crash sensor for detecting an impact of the object on the motor vehicle and at least one structure-borne noise sensor to detect bodywork vibrations. The evaluation device is embodied, to distinguish between a side impact and a front impact, to evaluate the frequency spectrum of the structure-borne noise signal output by the structure-borne noise sensor and to activate a passenger protection system tailored to the impact situation.

DE 102 31 364 A1 describes a device for controlling a passenger protection system of a motor vehicle which features a sensor system for detecting an impact between an object and the motor vehicle and an evaluation device for evaluating the signals supplied by the sensor system, so that information about the impact object and/or about the characteristics of the impact can be supplied. A passenger protection system is provided which can be actuated depending on the information about the impact object and/or about the characteristics of the impact. The sensor system includes at least one crash sensor for detecting an impact of the object on the motor vehicle and at least one acceleration sensor for detecting a deceleration of the vehicle. The evaluation device is embodied to distinguish between a pedestrian impact and a crash, to evaluate the vehicle deceleration and to activate a passenger protection system tailored appropriately to the impact situation or vehicle deceleration.

BRIEF SUMMARY OF THE INVENTION

The underlying object of the present invention is thus to specify an improved device and an improved method for controlling a passenger protection system of a motor vehicle which in particular makes it possible to reliably distinguish between the impact of a pedestrian and a crash.

An inventive device for controlling a passenger protection system of a vehicle includes at least one structure-borne noise sensor for picking up vehicle bodywork vibrations, as well as an evaluation device for evaluating the structure-borne noise signals supplied by the structure-borne noise sensor, so that information about the impact object and/or the characteristics of the impact can be supplied, with the evaluation device being embodied for analyzing the structure-borne noise signal in respect of the frequencies contained therein. In this case the frequency spectrum contained in the signal section is divided up into a number of frequency bands, the available energy for each frequency band is determined and a standardization of the signal energy of the frequency bands is undertaken. A passenger protection system is also provided which can be activated depending on the information about the impact object and/or the characteristics of the impact. Inventively the evaluation device is embodied to form the relationship between the signal energy of each of the frequency bands and the signal energy of a specific reference frequency band during the standardization, and to compare the resulting ratio curves with predetermined threshold values.

The structure-borne noise sensor can for example be based on a capacitive acceleration measurement principle or on a piezo-electric principle. It is conceivable to provide a larger number of structure-borne noise sensors for detection of bodywork vibrations and to distribute these over the area of an impact surface to be monitored. The use of foil sensors allows a spatially-extended sensor surface to be applied with a single structure-borne noise sensor.

The standardization of the signal energy of each of the frequency bands to the signal energy preferably of a lowest frequency band and the comparison with predetermined setpoint values allows a simple, fast and reliable evaluation of whether the impact object involved is a pedestrian, another motor vehicle or another object with very large mass. Over and above this the inventive device also allows the detection of misuse situations. This makes it possible in particular to activate the passenger protection system in a manner tailored to the given situation.

The principle underlying the invention is based in this case, as known from the prior art, on a spectral analysis of the structure-borne noise signal supplied by the structure-borne noise sensor. On the basis of trials it has been possible to verify that different impact objects or situations—misuse or crash with a pedestrian or another motor vehicle—leads to a different frequency spectrum which serves as an indicator for the impact object. For an impact of the vehicle against a curb, a hammer blow or an impact of a ball against the motor vehicle or such like, a frequency spectrum is produced with a small proportion of high-frequency vibrations, which also decay rapidly. By contrast collisions with pedestrians have a greater proportion of high-frequency vibrations which also take longer to decay. The intrusion of an object (e.g. motor vehicle or tree) into the motor vehicle and thereby the deformation of bearer structures causes frequency spectra in the high-frequency range which also are present for the duration of the deformation. The standardization in the manner described makes possible a reliable detection and thereby the activation of the passenger protection system tailored to the given situation.

In a development the evaluation device is embodied to divide up the frequency spectrum, in addition to the reference frequency band, into at least two further frequency bands so that a first and a second ratio curve are produced during the standardization. The two ratio curves obtained during the standardization are already sufficient to make a reliable distinction between a misuse situation, a pedestrian impact and a crash. The first ratio curve is preferably determined by forming a ratio of the signal energy of a midrange frequency band to the reference frequency band. The second ratio curve is determined by forming the ratio of the signal energy of a high frequency band to the reference frequency band.

In one embodiment there is provision for a decision to be made by the evaluation device on the basis of a comparison of the first ratio curve with a first threshold value as to whether the passenger protection system is to be activated or not.

In a further embodiment there is provision for a decision to be made by the evaluation device on the basis of a comparison of the second ratio curve with a second threshold value as to whether a pedestrian protection system is to be activated or not.

In a further embodiment there is provision for a decision to be made by the evaluation device on the basis of a comparison of the second ratio curve with a third threshold value as to whether an occupant protection system is to be activated or not.

The evaluation undertaken by the evaluation device thus consists of comparing the ratio curves determined by a standardization with respective threshold values. The comparison of the first ratio curve with a first threshold value makes it possible to distinguish whether a structure-borne noise signal issued by a structure-borne noise sensor was triggered by a misuse or not. The comparison of the second ratio curve with the second threshold value enables a distinction to be made between a pedestrian impact and a crash. Depending on this the evaluation device can make the decision as to whether a pedestrian protection system is to be activated or not. If the first threshold value is exceeded by the first ratio curve a defined number of times a comparison of the second ratio curve with a second setpoint value is undertaken. There can further be provision for comparing the second ratio curve with a third threshold value which is higher than the second threshold value in order to enable the severity of a collision to be deduced. In this way a decision can be made about whether and if necessary which occupant protection system is to be activated.

This method is based on the knowledge that in such collision situations, in which the motor vehicle for example collides with another motor vehicle or with a heavy object, the non-triggering of a pedestrian protection system is of advantage for the safety of the occupants of the motor vehicle. The structure-borne noise signals supplied by the structure-borne noise sensor will therefore not only be employed for determining the type of impact object but will also be employed to decide whether a pedestrian protection system is to be triggered or not, regardless of whether an occupant protection system might be triggered. A pedestrian protection system is thus only triggered if the structure-borne noise signals indicate a collision with a pedestrian.

The defined number of times that the relevant threshold is exceeded can be set to any given number in this case. Depending on the design of the device a single exceeding of a threshold can be interpreted as a pedestrian impact or a crash. To lower the sensitivity of the evaluation, exceeding the threshold a number of times can however also be defined as a criterion for a further evaluation.

The definition of the first, second and third threshold value depends on the bodywork structure of the motor vehicle. The threshold values can for example be determined on the basis of trials. In this case the rigidity, the mass and the deformation behavior of the motor vehicle will influence the level of the threshold values.

In a further embodiment the evaluation device is embodied to analyze the timing of the frequency spectrum contained in the structure-borne noise signal. The evaluation of the frequency spectrum contained in the curve of the structure-borne noise signal further improves reliability during evaluation. This advantageous variant is based on the knowledge that the proportion of high-frequency vibrations becomes greater the larger the mass of the impact object is and simultaneously the duration of the presence of high-frequency vibrations is increased. There is therefore also provision for the evaluation device to be embodied to detect the period of the presence of high-frequency components in the structure-borne noise signal.

To this end the evaluation device can be embodied to determine the different, especially midrange, signal energies contained in different time windows within the signal section and to relate them to one another. It is advantageous for a meaningful evaluation for a standardization to one of the time windows to be undertaken.

An especially reliable evaluation in respect of determining the impact object within the period of time of around 10 to 15 ms available until the passenger protection system is triggered is produced if the structure-borne noise sensor is arranged on a pliable component subjected to deformation during the impact, especially the fender covering of the vehicle.

By the provision of an additional crash sensor, e.g. of a deformation sensor of which the output signal is able to be routed to the evaluation device and is able to be evaluated by this, with a decision being made on the basis of the signal supplied by the crash sensor about the triggering of the passenger protection system, with the decision as to whether the passenger protection system or the occupant protection system is to be activated being able to be made on the basis of the structure-borne noise signal, further increases the reliability in determining the impact object.

The inventive method for controlling a passenger protection system of a vehicle has the same advantages as have previously been described in connection with the inventive device.

Inventively, during the standardization, the signal energy of each of the frequency bands is related to the signal energy of a specific reference frequency band, especially the lowest defined frequency band, and the resulting relationship is compared with predetermined threshold values. The "lowest frequency band" is to be understood as that defined frequency band in which the lowest frequencies of the frequency spectrum present in the structure-borne noise signal are contained.

This method makes possible a distinction between a collision with a pedestrian, a crash or other objects (misuse) within the time available of around 10 to 15 ms up to the point at which the passenger protection system is triggered. Since the impact object is able to be identified highly reliably the inventive method makes it possible to activate the suitable protection system of the passenger protection system. In the case of impact of a misuse object the triggering of the passenger protection system is suppressed. If the impact object is a pedestrian a pedestrian protection system is activated while the triggering of an occupant protection system is suppressed. If however the vehicle crashes into another vehicle, a wall or a tree for example, the triggering of the pedestrian protection system is suppressed and only occupant protection systems will be activated. The non-triggering of the occupant protection system increases the protective effect for the occupants of the vehicle in this case since the bodywork structure is not weakened because the pedestrian protection system is not triggered.

In one embodiment of the inventive method the frequency spectrum is divided into at least two further frequency bands in addition to the reference frequency band so that the result of the standardization is at least a first and a second ratio curve. The number of frequency bands and the frequency range selected in such cases can in principle be selected entirely at random and can for example be determined by trial and error.

On the basis of a comparison between the first ratio curve and the first threshold value a decision is made as to whether a passenger protection system is to be activated or not. If the threshold value is not exceeded then the situation is a misuse situation. If the threshold is exceeded one or more times a collision with a pedestrian or a crash situation can be assumed.

In the latter case a decision is made on the basis of a comparison of the second ratio curve with a second threshold value as to whether a pedestrian protection system is to be activated or not. Furthermore a decision is made on the basis of a comparison between the second ratio curve and a third threshold value as to whether an occupant protection system is to be activated or not. The comparison of the second ratio curve with a second and third threshold value thus makes it possible to trigger the suitable protection system of the passenger protection system in a manner tailored to the situation.

In accordance with one embodiment of the method the decision as to whether the passenger protection system or the pedestrian protection system will or will not be activated is made on the basis of a defined number of times that the value exceeds or drops below the corresponding threshold. Any numbers can be selected for this, with the sensitivity of triggering being reduced if a high number is defined.

Preferably the timing of the frequency spectrum contained in the structure-borne noise signal is also analyzed in order to further increase the reliability of the evaluation.

In this case the duration of the presence of high-frequency components in the structure-borne noise signal is analyzed. This enables a conclusion to be drawn about the type of impact object, since there is an increase in higher-frequency vibrations as the mass of the impact object increases. At the same time the decay time for the high-frequency vibrations is increased. Preferably the signal energies, especially midrange signal energies contained in different time windows within the different signal sections, are determined and related to each other.

The distinction between a collision with a pedestrian and a crash situation can also be made by providing as a sensor system for detecting a collision between an object and the vehicle a crash sensor for detecting an impact of the object on the vehicle and at least one of structure-borne noise sensor to pick up bodywork vibrations, with the evaluation device to distinguish between a pedestrian impact and a crash being embodied to evaluate the frequency spectrum of the structure-borne noise signal emitted by the structure-borne noise sensor and to activate a passenger protection system that is tailored to the impact situation or to the impact object.

The evaluation of the frequency spectrum by the evaluation device comprises a comparison of high-frequency signal components with low-frequency signal components. This inventive device makes it possible for the structure-borne noise sensor to be arranged not only in the area of a pliable component of the vehicle subjected to deformation on impact but also to be arranged on a fixed component of the vehicle bodywork. The arrangement of the structure-borne noise sensor far away from the impact location can for example lead in a misuse situation to no high frequency vibrations being perceived by the structure-borne noise sensor after detection of an impact by the crash sensor. There is thus no triggering of the passenger protection system. A non-detection of structure-borne noise signals can likewise occur if for example a deformation and thereby the collision with an object has been detected by the crash sensor and the impact object is a pedestrian, whereby central bodywork components are not excited into oscillation. In this case an activation of the pedestrian protection system is initiated and the triggering of the passenger protection system is suppressed. The presence of high-frequency vibrations on the bodywork components as a result of their deformation points however to a crash with a larger object adversely affecting the safety of the occupants, whereby the occupant protection system is activated.

Another device for controlling a passenger protection system of a vehicle, and especially for distinguishing between a collision with a pedestrian and a crash situation, provides for at least one crash sensor for detecting an impact object on the vehicle and at least one acceleration sensor for picking up a deceleration of the vehicle to be combined, with the evaluation device being embodied to make a distinction between a pedestrian impact and a crash, to evaluate the vehicle deceleration and activate a passenger protection system tailored to the impact situation or the vehicle situation. The crash sensor is preferably a deformation sensor which detects an impact on the basis of the deformation of the corresponding component of the bodywork. If the crash sensor detects an impact the vehicle deceleration is also to be evaluated. The different mass relationships for a pedestrian impact and a crash situation can be determined by the acceleration sensor. An impact with a pedestrian does not lead to a significant deceleration of the vehicle because of their low mass compared to that of the vehicle. In the case of no deceleration or very slight deceleration the pedestrian protection system is then activated. In the event of a significant deceleration, evaluated by a comparison with a fixed comparison threshold tailored to the vehicle for example, a triggering of the pedestrian protection system is suppressed and an occupant protection system is triggered.

The knowledge on which the invention is based is that the objects leading to a deformation of a bodywork component, especially of a fender covering, differ considerably in the frequency spectrum generated on impact. Thus for example different non-triggering objects (misuse) excite low-frequency vibrations. Pedestrians excite vibrations in a midrange frequency range, provided said pedestrians collide with the vehicle such that a pedestrian protection system is to be triggered. In the event of the vehicle crashing a very high-frequency excitation of the bodywork component results. The provision of structure-borne noise sensors, especially on bodywork components subjected to the collision, can precisely detect this frequency spectrum. An evaluation of the frequency spectrum by a spectral analysis and standardization, in which the detected signals are divided up into a number of frequency bands and are related to a reference frequency band, can be distinguished after a threshold value comparison.

The combination of a crash sensor with a structure-borne noise sensor or an acceleration sensor enables a passenger protection system to be made more robust and allows it to be triggered more precisely. In this case the signals delivered by the structure-borne noise sensor or acceleration sensor can on the one hand be included for confirming a triggering of the passenger protection system and on the other hand can provide information about the type of impact, which enables the passenger protection system to be triggered in a targeted manner.

The invention will be explained in greater detail below with reference to the figures. The figures show.

BRIEF DESCRIPTION OF THE SEVERAL VIEWS OF THE DRAWING

DESCRIPTION OF THE INVENTION

Figure 1:
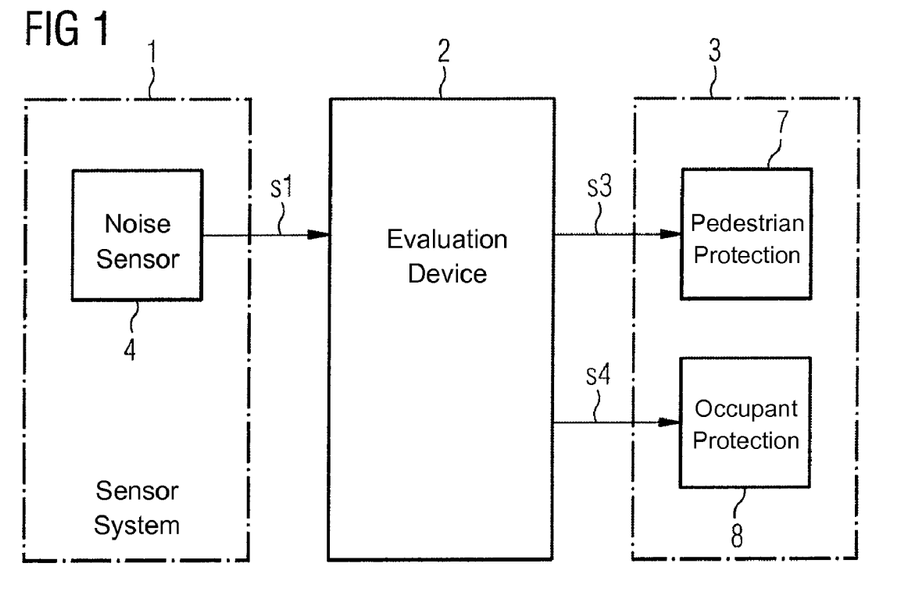
FIG. 1 a first exemplary embodiment of an inventive device for controlling a passenger protection system of a vehicle, FIG. 2 a typical ratio curve for standardizing a frequency band featuring midrange frequencies to a reference frequency band, FIG. 3 a typical ratio curve of standardizing a frequency band featuring high frequencies to a reference frequency band, FIG. 4 the curves of a structure-borne noise signal produced by a hammer blow and a pedestrian impact over time and the ratio values produced for a number of measurements, and FIG. 5 a further exemplary embodiment of an inventive device for controlling a passenger protection system of a motor vehicle.

FIG. 1 shows a schematic diagram of an inventive device for controlling a passenger protection system. A sensor system 1 for detecting an impact and for identifying an impact object comprises a structure-borne noise sensor 4 which, in the case of an impact, transmits a structure-borne noise signal s1 to an evaluation device 2. The structure-borne noise sensor 4 is preferably accommodated on those elements of the bodywork which are subject to deformation during an impact by an object. This can for example be the fender covering of a fender. This ensures that the vibrations of the bodywork component caused by the impact can be detected without any major attenuation directly by the structure-borne noise sensor.

A structure-borne noise sensor based on a capacitive acceleration measurement principle can be used for signal detection. For this type of detection the sensor system includes at least one, preferably three or more structure-borne noise sensors 4, which are accommodated directly on the fender covering. Alternatively the use of piezo-electric-based structure-borne noise sensors is possible. These structure-borne noise sensors embodied for example as foil sensors allow a spatially-extended sensor surface to be provided with a single sensor element, which guarantees a good signal transmission or detection regardless of the point of impact.

The evaluation device 2 is coupled to a passenger protection system 3, with the passenger protection system 3 being controlled by this. The passenger protection system 3 includes a pedestrian protection system 7 as well as an occupant protection system 8. The pedestrian protection system 7 and the occupant protection system 8 are able to be activated separately by the evaluation device 2 via respective signals s3 or s4. The pedestrian protection system for example comprises a device for lifting the hood of the vehicle. By lifting the hood a free space of around 70 mm is created in the event of a collision with a pedestrian, which reduces the impact, especially in the head area of the pedestrian. The occupant protection system can include a plurality of airbags, a seat belt tensioner, active head restraints and such like which are each able to be explicitly controlled by the evaluation device 2.

To provide the best possible protection for the occupants of the vehicle on impact of an object, especially a crash with another vehicle, with a wall or with a tree, as well as the impact of a pedestrian, the most precise possible detection of the impact object by the evaluation device 2 is required. The evaluation device 2 must further be in a position to also recognize those situations in which for example an impact by a hammer blow or a ball occurs which is not to lead to the passenger protection system 3 being triggered.

It is possible to distinguish between and to identify the impact objects through the evaluation by the evaluation device 2 of the structure-borne noise signal s1 emitted by the structure-borne noise sensor 4. To this end a section of the signal is observed for a time which at its maximum can be from the detection of the impact up to the latest possible time of deciding to trigger the passenger protection system 3, but can also be shorter than this. The evaluation of the frequency spectrum includes a spectral analysis and standardization.

The structure-borne noise signal s1 transmitted to the evaluation device 2 is divided up into a plurality of frequency bands. It is sufficient in this case to divide that signal into three frequency bands, a lowest frequency band containing low frequencies as the reference frequency band, a midrange or first frequency band containing midrange frequencies and also a high or second frequency band containing high frequencies. The two last-mentioned frequency bands are related to the reference frequency band containing the lowest frequencies, i.e. a ratio of respective signal energies is determined over time and then compared to a threshold value.

Figure 2:
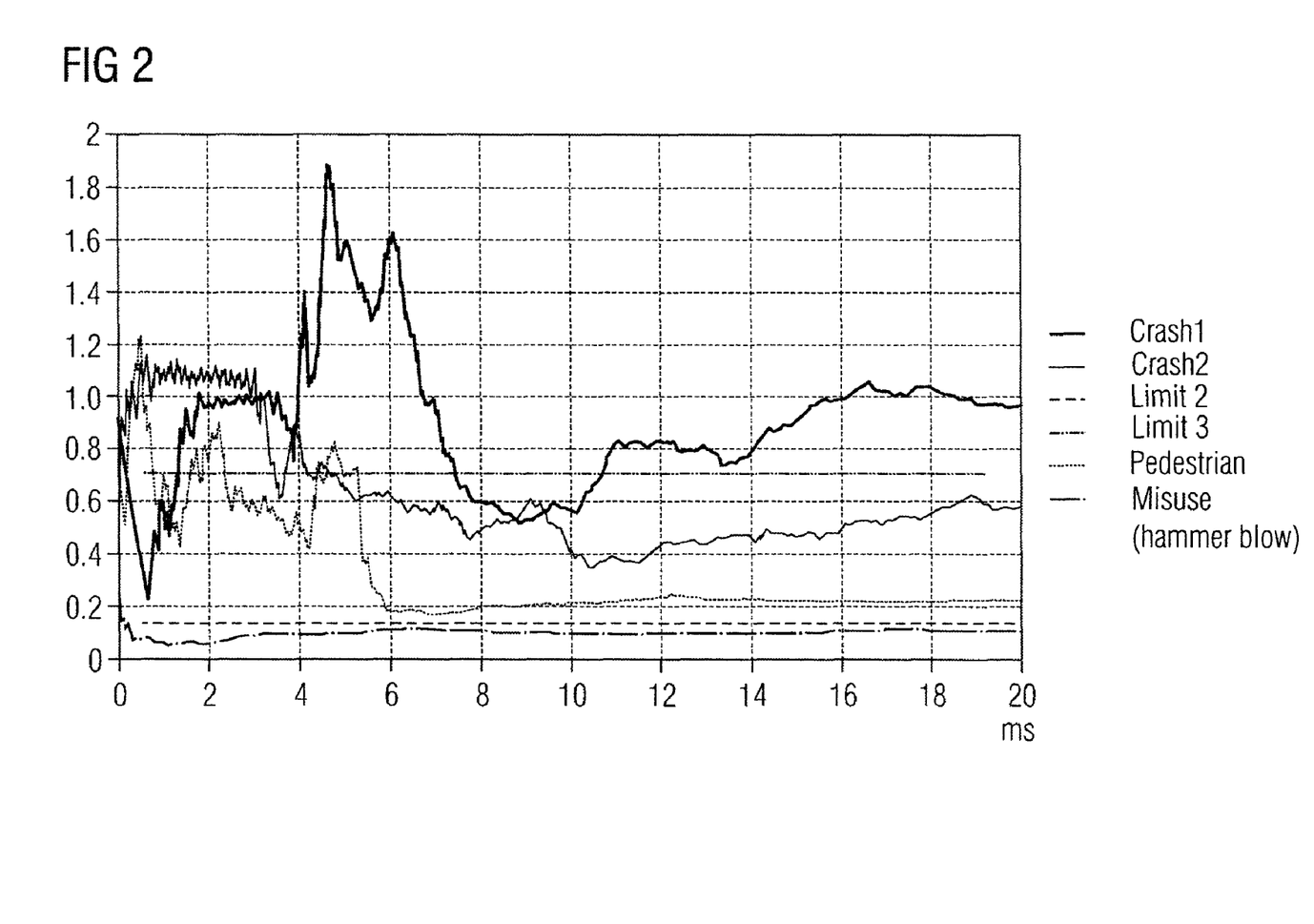
Figure 3:
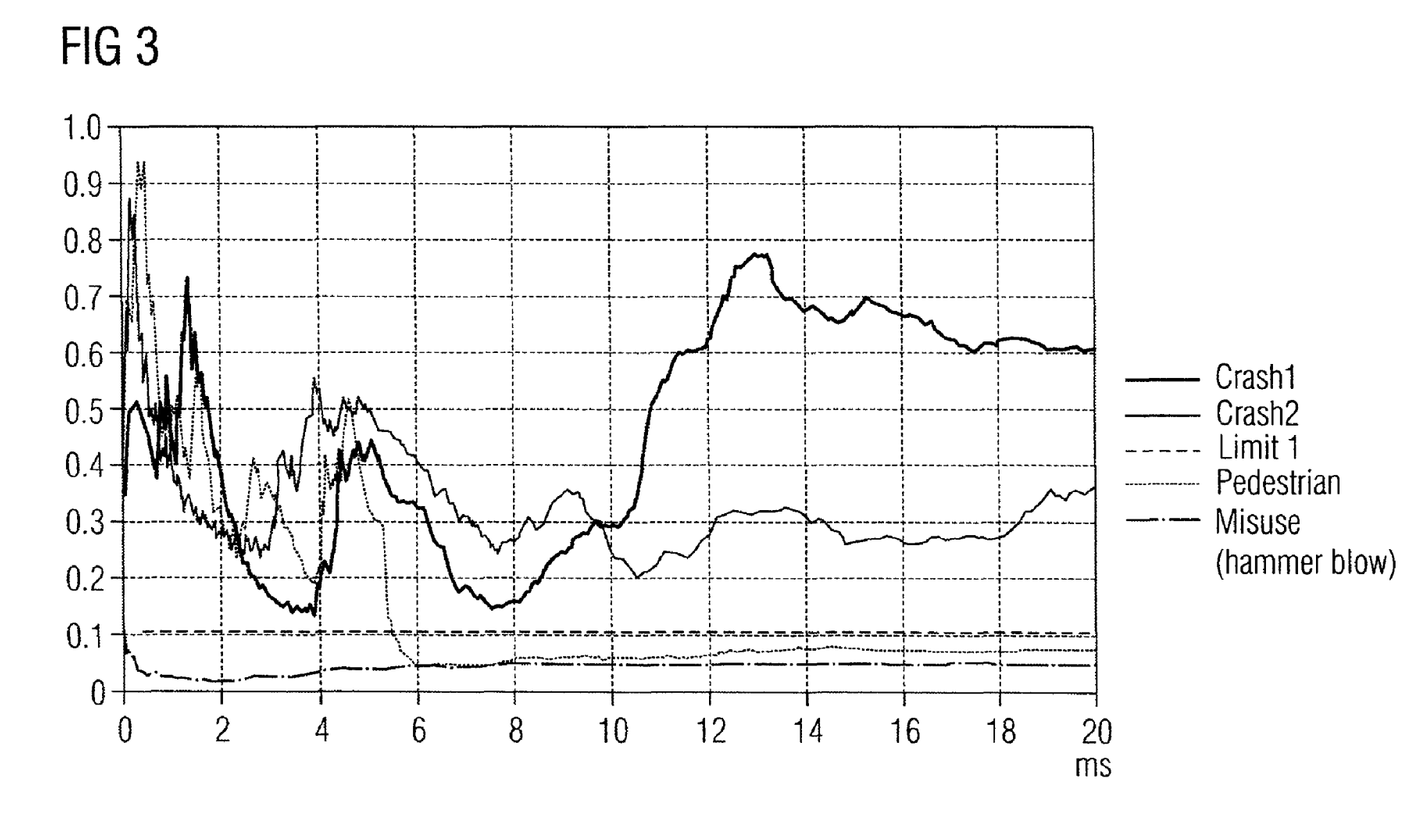

FIGS. 2 and 3 show ratio curves of two different frequency bands with midrange frequencies related to a reference frequency band in each case (FIG. 2) and high frequencies (FIG. 3). In the exemplary embodiment the reference frequency band covers a range of 1 kHz to 5 kHz, the midrange frequency band a range of 5 kHz to 10 kHz and the frequency band containing the high frequencies a range of 16 kHz to 21 kHz.

The figures show the ratio curves of a hammer blow, a collision with a pedestrian as well as two crashes (crash 1, crash 2) plotted against time. For each frequency band standardized to the reference frequency band at least one threshold value (identified in the figures as Limit 1, Limit 2, Limit 3) is determined which is compared with or related to a ratio curve resulting from the impact. If the threshold value Limit 1 of the midrange frequency band (FIG. 3) is exceeded by the computed ratio curve, but not the threshold Limit 2 of the upper frequency band (FIG. 2), it can be deduced that the vehicle has collided with a pedestrian. If the threshold value Limit 2 of the upper frequency band is also exceeded, a crash situation is involved, so that the evaluation device 2 suppresses triggering of the pedestrian protection system 7 and activates an occupant protection system 8.

The sensitivity for deciding on triggering the passenger protection system can be defined in this case such that, even if the relevant threshold is exceeded a single time by the ratio curve the consequences described above can be deduced. The evaluation device 2 can however also be designed such that, to trigger a specific protection system (pedestrian protection system 7 or occupant protection system 8) it must be established that the respective threshold value has been exceeded more than once. Apart from a comparison any evaluations of ratio curve and limit values in relation to each other are basically conceivable.

In FIGS. 2 and 3 the ratio curve labeled Crash1 designates a crash in accordance with Euro-NCAP standard in which an occupant protection system must be triggered to protect the vehicle occupants. By contrast with this, the ratio curve labeled Crash2 represents a situation in which there is a crash, with another vehicle for example, but it is not necessary to trigger the occupant protection system 8. Triggering the system would not increase the protection for the occupants but would however lead to considerably higher repair costs for the vehicle. To distinguish between these two cases a third threshold value labeled Limit 3 is introduced in FIG. 2 which, depending on the severity of the impact, makes it possible to activate the occupant protection system 8 in a manner tailored to the situation.

Figure 4:
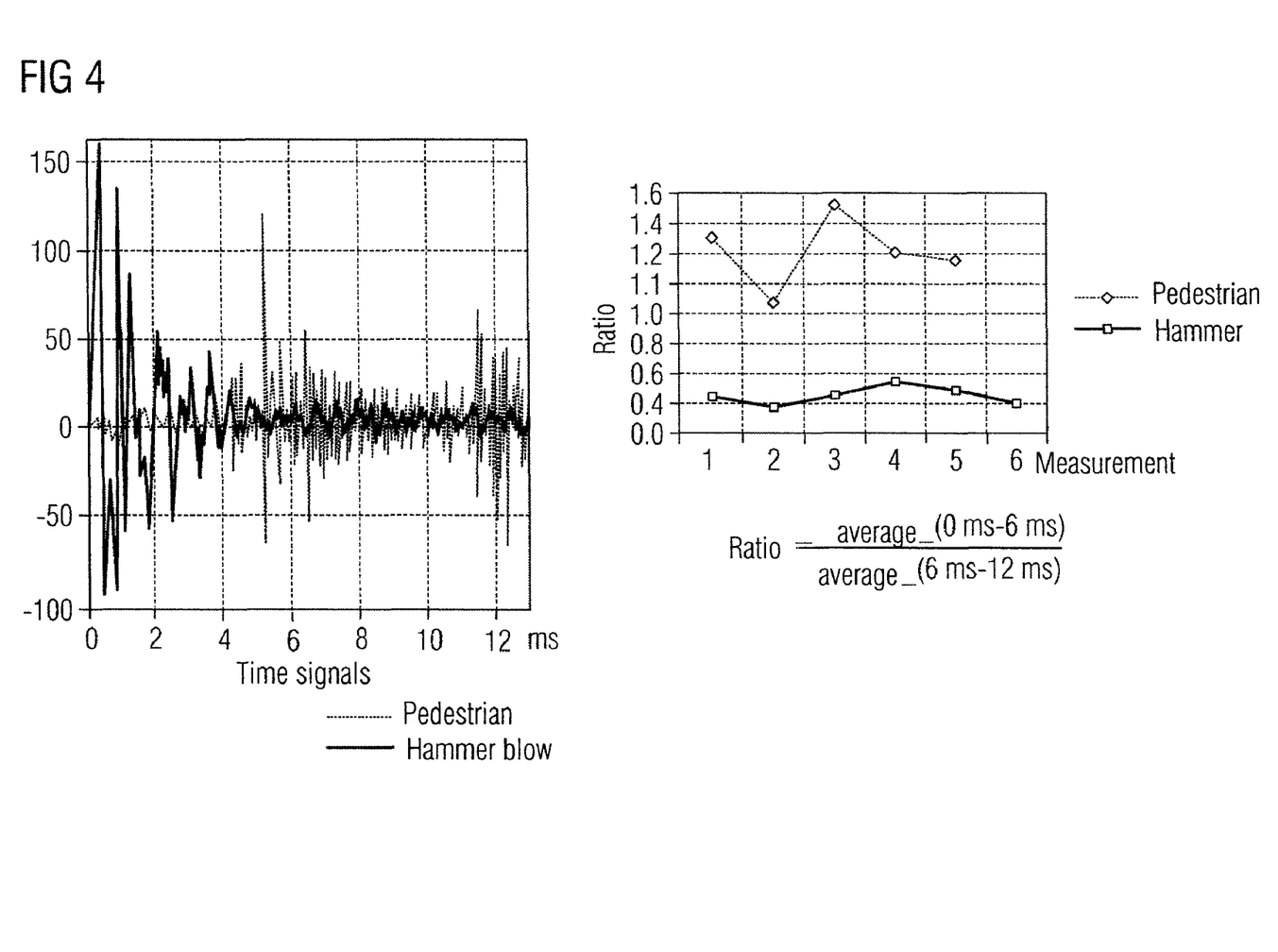

A further increase of the reliability and accuracy of evaluating the impact object is produced by observing how long high-frequency components are present in a structure-borne noise signal. Misuse situations, such as a hammer blow, lead to a very rapid decay of the structure borne noise signal, similar to an e-function. In a collision with a pedestrian on the other hand the high-frequency signal components are present for significantly longer. This can be evaluated by evaluating the structure-borne noise signals in two consecutive time windows (FIG. 4). In this figure the lower path shows the structure borne-noise signals emitted by a structure-borne noise sensor for a hammer blow and a collision with a pedestrian. Shown in the right half of the figure are the ratio values produced by a ratio formation for a total of six different test measurements. Each measurement corresponds to an impact in this diagram. To determine each measured value the amounts of the amplitudes in a period of 0 to 6 ms and a period of 6 to 12 ms are summed and averaged.

Figure 5:
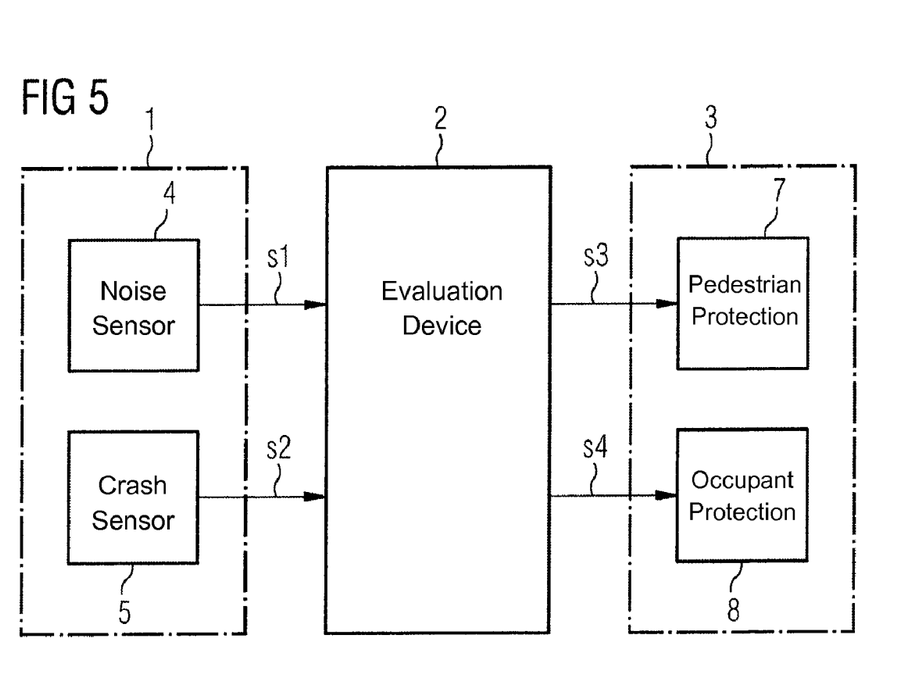

FIG. 5 shows a second exemplary embodiment of an inventive device for controlling a passenger protection system of a vehicle. In addition to the exemplary embodiment shown in FIG. 1 the sensor system 1 features a crash sensor 5. The crash sensor 5 can for example be embodied in the form of a fiber optic deformation sensor. Whereas the variant described in FIG. 1, which exclusively comprises a structure-borne noise sensor for detection of an impact object, requires the structure-borne noise sensor to be arranged directly on the outer skin of the fender, in the second exemplary embodiment the collision sensor can also be accommodated on a part of the bodywork, for example the chassis. The second exemplary embodiment in particular makes it possible to distinguish a collision with a pedestrian from a crash. When a deformation is established by the crash sensor 4 the structure-borne noise sensor 5 is activated and transfers a structure-borne noise signal s1 to the evaluation device 2. The evaluation of the structure-borne noise signal can be undertaken on the basis of a simple comparison of high-frequency signal components with low-frequency signal components. If the high-frequency signal components dominate, a crash situation is involved. If they do not, the vehicle has collided with a pedestrian. It is assumed in this case that a sufficient deformation to activate the crash sensor 5 is not possible through a misuse situation.

Provided the structure-borne noise sensor 4 is based on a capacitive acceleration principle this sensor can also be used for detection of the accelerations caused by the impact. In this case the different mass ratios for a crash and a collision with a pedestrian can be evaluated by the evaluation device 2. As a result of the wide differences in mass between the pedestrian and the vehicle a collision with a pedestrian does not lead to a significant deceleration of the vehicle, so that when the deformation is established the pedestrian protection system 7 is triggered. If on the other hand, on detection of a deformation a very sharp deceleration is established, this leads to the conclusion that the vehicle has collided with an object of large mass, which suppresses the triggering of the pedestrian protection system 7 and activates the occupant protection system 8.

Of course instead of an appropriately matched structure borne-noise sensor 4, any other acceleration sensor can be employed for detection of the deceleration.

The invention claimed is:

1. A device for controlling a passenger protection system of a motor vehicle, comprising:
   at least one structure-borne noise sensor disposed to pick up vehicle body vibrations and to output a structure-borne noise signal;
   an evaluation device connected to receive the structure-borne noise signal from said sensor and to evaluate the structure-borne noise signal for generating information about an impact object and/or a characteristic of a collision;
   said evaluation device being configured to analyze the sensor signal in respect of the frequencies contained therein, by:

dividing a frequency spectrum contained in a signal section into a number of frequency bands;

determining a signal energy for each frequency band; and standardizing the signal energy of the frequency bands, thereby relating the signal energy of each of the frequency bands to a signal energy of a specific reference frequency band, and comparing resulting ratio curves with predetermined threshold values;

wherein the passenger protection system is activated in dependence on the information about the impact object and/or the characteristic of the collision.

2. The device according to claim 1, wherein said evaluation device is configured to divide up the frequency spectrum into at least two further frequency bands in addition to the reference frequency band, so that the result of standardization is at least a first and a second ratio curve.

3. The device according to claim 1, wherein said evaluation device is enabled to render a decision, based on the comparison between the first ratio curve and a first threshold value, whether or not the passenger protection system will be activated.

4. The device according to claim 1, wherein said evaluation device is enabled to render a decision, based on a comparison between the second ratio curve and a second threshold value, whether or not a pedestrian protection system will be activated.

5. The device according to claim 1, wherein said evaluation device is enabled to render a decision, based on a comparison between the second ratio curve and a second threshold value, whether or not an occupant protection system will be activated.

6. The device according to claim 1, wherein a determination of a first threshold value, a second threshold value, and a third threshold value depends on a bodywork structure of the motor vehicle.

7. The device according to claim 1, wherein said evaluation device is configured to analyze a timing of a frequency spectrum contained in the structure-borne noise signal.

8. The device according to claim 7, wherein said evaluation device is configured to detect a period of time during which the high-frequency components are present in the structure-borne noise signal.

9. The device according to claim 7, wherein said evaluation device is configured to relate the signal energies to one another.

10. The device according to claim 7, wherein said evaluation device is configured to relate the midrange signal energies contained in different time windows within the signal section with one another.

11. The device according to claim 9, wherein the signal is standardized to one time window.

12. The device according to claim 1, wherein said structure-borne noise sensor is disposed on a pliable component of the motor vehicle subject to deformation in a crash.

13. The device according to claim 1, which further comprises a crash sensor outputting a signal to said evaluation device for evaluation by said evaluation device, and wherein said evaluation device is configured to render a decision on a basis of the signal received from said crash sensor about a triggering of the passenger protection system, and a decision being rendered based on the structure-borne noise signal whether the pedestrian protection system or the occupant protection system is to be activated.

14. A method of controlling a passenger protection system of a motor vehicle, the method which comprises:

picking up bodywork vibrations with at least one structure-borne noise sensor and outputting a structure-borne noise signal;

evaluating the structure-borne noise signal with an evaluation device to determine information about an impact object and/or characteristics of a collision, the evaluation device analyzing the structure-borne noise signal in respect of the frequencies contained therein, by dividing the frequency spectrum contained in the signal section into a number of frequency bands;

determining a signal energy for each of the frequency bands; and standardizing the signal energy of the frequency bands and thereby relating the signal energy of each of the frequency bands to a signal energy of a specific reference frequency band and comparing a resulting relationship with predetermined threshold values;

selectively activating a passenger protection system depending on the information about the impact object and/or the characteristics of the collision.

15. The method according to claim 14, which comprises dividing the frequency spectrum into at least two further frequency bands in addition to the reference frequency band, so that a result of the standardization is at least a first and a second ratio curve.

16. The method according to claim 15, which comprises rendering a decision based on a comparison between the first ratio curve and a first threshold value as to whether or not the passenger protection system is to be activated.

17. The method according to claim 15, which comprises rendering a decision based on a comparison of the second ratio curve with a second threshold value as to whether or not a pedestrian protection system is to be activated.

18. The method according to claim 15, which comprises rendering a decision based on a comparison between the second ratio curve and a third threshold value as to whether or not the occupant protection system is to be activated.

19. The method according to claim 14, which comprises rendering the decision as to whether or not the passenger protection system, a pedestrian protection system, or an occupant protection system is to be activated based on a defined number of times that the value overshoots or undershoots a given threshold.

20. The method according to claim 14, which comprises analyzing a timing of the frequency spectrum contained in the structure-borne noise signal.

21. The method according to claim 20, which comprises analyzing a period of time during which higher-frequency components are present in the structure-borne noise signal.

22. The method according to claim 20, which comprises determining and relating the signal energies contained in the different time windows of the signal section to each other.

23. The method according to claim 22, which comprises determining and relating the midrange signal energies contained in the different time windows of the signal section to each other.

24. The method according to claim 22, which comprises carrying out a standardization to a first time window following an impact.

25. A device for controlling a passenger protection system of a vehicle, comprising:

a sensor system for detecting a collision of an object with the vehicle, said sensor system including at least one crash sensor for detecting an impact of the object on the motor vehicle and at least one structure-borne noise sensor for picking up vehicle bodywork vibrations and outputting a structure-borne noise signal;

an evaluation device connected to receive sensor signals from said sensor system and evaluating the sensor signals such that information about an impact object and/or about a characteristic of the collision can be supplied, and for activation of a passenger protection system tailored to the impact situation;

said evaluation device, for distinguishing a pedestrian impact from a crash, evaluating a frequency spectrum of the structure-borne noise signal emitted by the structure-borne noise sensor and, as a part of the evaluation, to compare high-frequency signal components with low-frequency signal components; and a passenger protection system that is activated depending on the information about the impact object and/or about the characteristics of the collision.

26. The device according to claim 25, wherein the structure-borne noise signal is analyzed after detection of an impact by the crash sensor.

27. The device according to claim 25, wherein said structure-borne noise sensor is mounted to a rigid part of the body in the motor vehicle.

28. The device according to claim 25, wherein said structure-borne noise sensor is disposed on a pliable component of the vehicle subjected to a deformation during an impact.

* * * * *